Sept. 24, 1963  L. A. RINGLE  3,104,846
FILM CASING AND CARTRIDGE
Filed Jan. 31, 1961
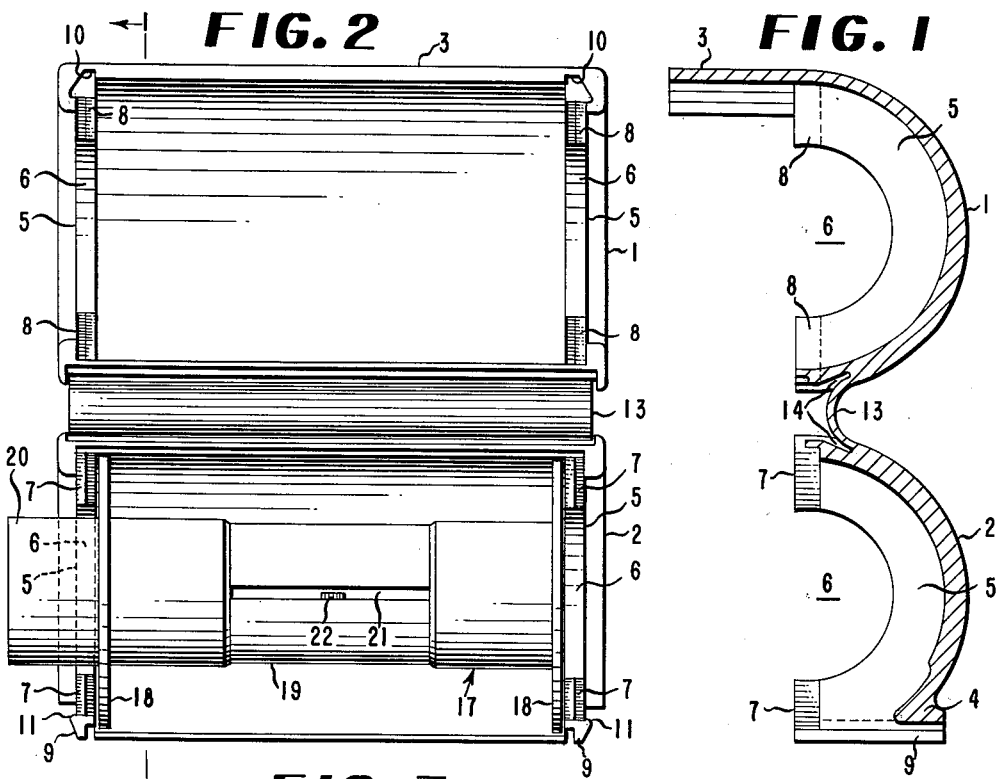
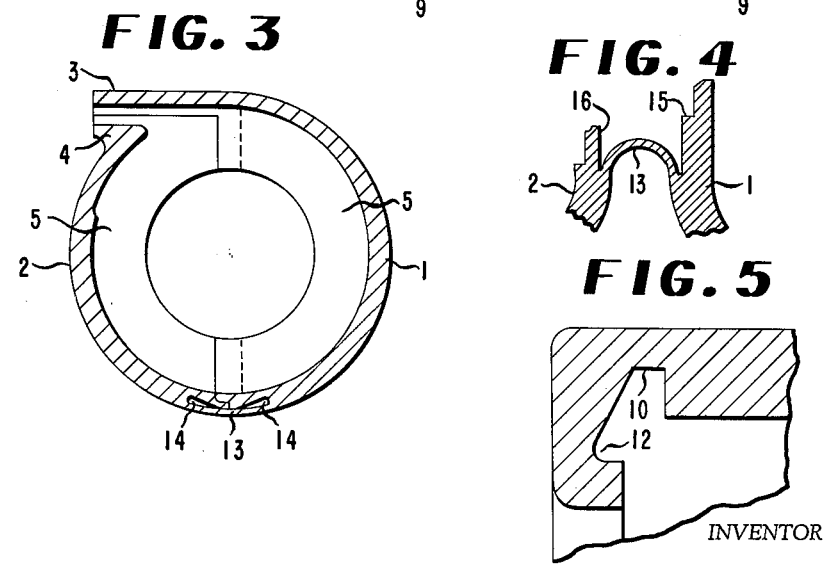
INVENTOR
LOUIS A. RINGLE
BY *Lynn Barrett Morris*
ATTORNEY United States Patent Office 3,104,846
Patented Sept. 24, 1963

3,104,846
FILM CASING AND CARTRIDGE
Louis August Ringle, Green Acres, Wilmington, Del., assignor to E. I. du Pont de Nemours and Company, Wilmington, Del., a corporation of Delaware
Filed Jan. 31, 1961, Ser. No. 86,092
2 Claims. (Cl. 242—71.1)

This invention relates to an improved casing for a spool of photographic film and to an assembled film cartridge embodying said casing.

Various types of metal and plastic casings for spools of photographic film are known. In general, the casings have three or more separate parts and they require time for assembly to form a light-proof cartridge. A practical plastic casing is disclosed in assignee's Nebel U.S. Patent 2,476,996, patented July 26, 1949. This casing has three separate parts, two being interfitting body members and the third a spring clip to hold the casing in assembled relationship with a spool of film.

An object of the present invention is to provide an improved casing for a spool of photographic film. Another object is to provide such a casing which has but one part and and can be opened easily to receive a spool of such film and closed readily to form a light-proof cartridge. A further object is to provide such a casing which is simple in structure and provides a sturdy, dependable, light-proof film cartridge. Still further objects will be apparent from the following detailed description of the invention.

The novel casing for spools of photographic film of this invention comprise two semicylindrical body halves of light-proof plastic material having end walls provided with semicircular openings at their centers adapted to receive the hub of a film spool and having interfitting tongues and grooves at the radial edges of said walls, one of said halves having a tangentially extended lip and the other a coacting lip extending parallel to the first lip, the lips providing therebetween a narrow slot for the passage of a film, the surfaces of said lips having interfitting tongues and grooves; said casing being characterized by having the halves joined by an integral thin flexible hinge extending the full width of the casing. The cartridge of the invention comprises said casing and an interfitting spool for film having flanges adjacent the inner walls of the casing and a protruding hub extending through the circular opening in the ends of the casing in assembled form.

The casing and assembled cartridge of the invention will now be more fully described with reference to the accompanying drawing which forms a part of this application. In the drawings, the same reference numerals refer to the same parts throughout the several views. With reference to the drawing:

FIG. 1 is a section of the casing taken along line 1—1 of FIG. 2.

FIG. 2 is a front elevation of the casing in an open position and showing a spool in position.

FIG. 3 is a section of the casing in closed position with parts in end elevation;

FIG. 4 is an enlarged sectional view showing the flexible hinge in detail; and

FIG. 5 is an enlarged sectional view of the coacting tongue and groove construction of the lips.

The casing of this invention, as illustrated in the drawing, consists of two interfitting, semicylindrical rigid body halves, namely, upper half 1 and lower half 2. The upper half has a protruding tangential lip 3 and the lower half has a coacting lip 4 extending parallel to lip 3, the lips providing therebetween a narrow slot for the passage of film. The end walls 5 of the semicylindrical halves have at their centers semicircular openings 6 which are adapted to receive the protruding hub of a film spool. The end walls on the lower half member have a tongue or knife-edge 7 on their radial edges which interfit with grooves 8 in the radial edges of the end walls of the upper body half member. The lower lip has protruding tongues 9 which are preferably at right angles to, and in alignment with, respective tongues 7. Each tangential tongue 9 fits into a tangential groove 10 on the lower surface of the upper lip 3. Preferably the tongue 9 has a lateral ridge 11 which extends into a coacting lateral groove 12 in the upper lip shown in FIG. 5. The body halves 1 and 2 are joined together at their lower juncture or medial point, generally diagonally from the point of tangency of the lip member, with an integral, thin, longitudinal, flexible hinge 13. This hinge extends lengthwise the entire width of the body halves. The body halves are preferably cut away or have recessed portions 14 under the hinge to facilitate rapid and smooth closure. In addition, the upper body member preferably has an offset portion 15 along its longitudinal edge and the lower body half an interfitting fillet 16 at its longitudinal edge so that when the halves are in assembled position the edges overlap, thus further improving the light-proofing character of the film casing and cartridge.

In FIG. 2 of the drawing there is shown a coacting film spool 17 which fits into the casing. This spool has end flanges 18 which are immediately adjacent the end walls of the casing. The spool preferably has a central hub 19 and preferably has protruding hub portion 20 which extends through a wall of the casing. The central hub preferably has a film-receiving slot 21 which may have a hook projection 22 adapted to receive a hole in the end of a film to be wound onto and unwound from the spool.

In assemblying the film cartridge of the invention, a spool of film is inserted into the upper or lower half body member and the two body halves are swung into position and squeezed so that the tongues and grooves interfit.

With the construction more clearly set forth in FIG. 3 of the drawing, the two halves snap into position and remain in that position so that the entire film cartridge is light-proof and needs no further means for holding the parts in assembled relationship. In general, the cartridge will contain photographic film having perforations along one or both edges which interfit with sprockets in cameras and projectors.

In assemblying the two parts a portion of the film or leader is placed between the lip portions and extends beyond the film that that it can be grasped and inserted into a camera.

The body halves of the casing and the spool can be made of any suitable plastic material by a conventional molding procedure. The plastic materials should have some degree of flexibility so that the hinge can be flexed during assembly and disassembly without rupture. Among useful thermoplastic materials are nylon (polyamides); polyethylenes and polypropylenes; cellulose derivatives, e.g., cellulose acetate, cellulose propionate, cellulose acetate butyrate, cellulose acetate propionate; polystyrene, polyacrylic acid esters, etc. Injection molding methods are preferred.

The spools used in cartridges may be composed of the somewhat flexible plastic materials just mentioned or of other materials, e.g., wood, metal, or wood and metal. Suitable additional plastic materials are given in the above-mentioned Nebel patent.

The plastic compositions can, of course be modified by the incorporation of various plasticizers, e.g., camphor, aryl phosphates, alkyl phthalates, glycerol, castor oil, etc.;

pigments, e.g., lithopone, graphite, carbon black, titanium oxide, phthalocyanine dyes, etc., fillers, e.g., wood flour, diatomaceous earth, etc.

For the metal spools, die castings, as well as powdered metal molding operations, may be resorted to. Among useful metals are brass and aluminum.

The spools and interfitting casing should be photographically inert so that the film elements spooled thereon will not be deleteriously affected. The spools and interfitting casing can be covered with an inert varnish or lacquer to insure against possible deleterious ingredients in the body thereof.

If desired, the lip members can be lined with cut-velvet or with pile velvet; felt, velours, polyurethane or other sponge material, or materials made by a flocking process.

Various types of spools can be used in the film casings of this invention. These spools can have various types of slots or other construction to attach the film element to the hub. A practical hub and slot construction and hook is described in Schmidt U.S. Patent 2,477,010, July 26, 1949.

The film casing of this invention has the advantage that it can be readily made and assembled. It is simple in construction and dependable in use. Once the spool is loaded into the casing, the cartridge can be assembled by a simple arcuate motion. The two half body members snap into an interlocking relationship. Assembly in a darkroom is simplified as there is only one casing to be assembled into a unitary cartridge. Inventory problems are simplified as one does not have to accumulate a supply of separate body members. Still other advantages will be apparent from the foregoing description of the invention.

I claim:

1. A light-proof film cartridge comprising a film spool in a casing comprising two semicylindrical body halves having end walls provided with semicircular openings at their centers adapted to receive the hub of a film spool and having interfitting tongues and grooves at the radial edges of said end walls, the upper body half having a tangentially extended lip and the other half a coacting lip extending parallel to the first lip, the lips providing therebetween a narrow slot for the passage of a film, the lower lip having near each end and adjacent to said slot a protruding tongue with a lateral bead and a slanting outer wall, the upper lip having a coacting groove near each end and adjacent said slot that interfits with said tongue and bead, said casing being characterized by having the halves joined by an integral flexible hinge extending the full width of the casing.

2. A cartridge according to claim 1 wherein the body halves are made of plastic material, have overlapping portions at their longitudinal edges and recessed portions beneath the flexible hinge.

References Cited in the file of this patent

UNITED STATES PATENTS

| 2,476,996 | Nebel | July 26, 1949 |
| 2,687,157 | Cowan | Aug. 24, 1954 |
| 2,731,894 | Leitz et al. | Jan. 24, 1956 |
| 2,844,244 | Hanson | July 22, 1958 |
| 2,885,135 | Friday | May 5, 1959 |

FOREIGN PATENTS

| 467,008 | France | Mar. 20, 1914 |
| 908,283 | France | Sept. 3, 1945 |